Sept. 13, 1966  E. T. YOUNG  3,272,217
SYSTEMS FOR PROPORTIONING FLUIDS
Filed March 16, 1962  5 Sheets-Sheet 1

INVENTOR.
EINAR T. YOUNG
BY George L. Church
ATTORNEY

Sept. 13, 1966   E. T. YOUNG   3,272,217
SYSTEMS FOR PROPORTIONING FLUIDS
Filed March 16, 1962   5 Sheets-Sheet 4

INVENTOR.
EINAR T. YOUNG
BY George L. Church
ATTORNEY

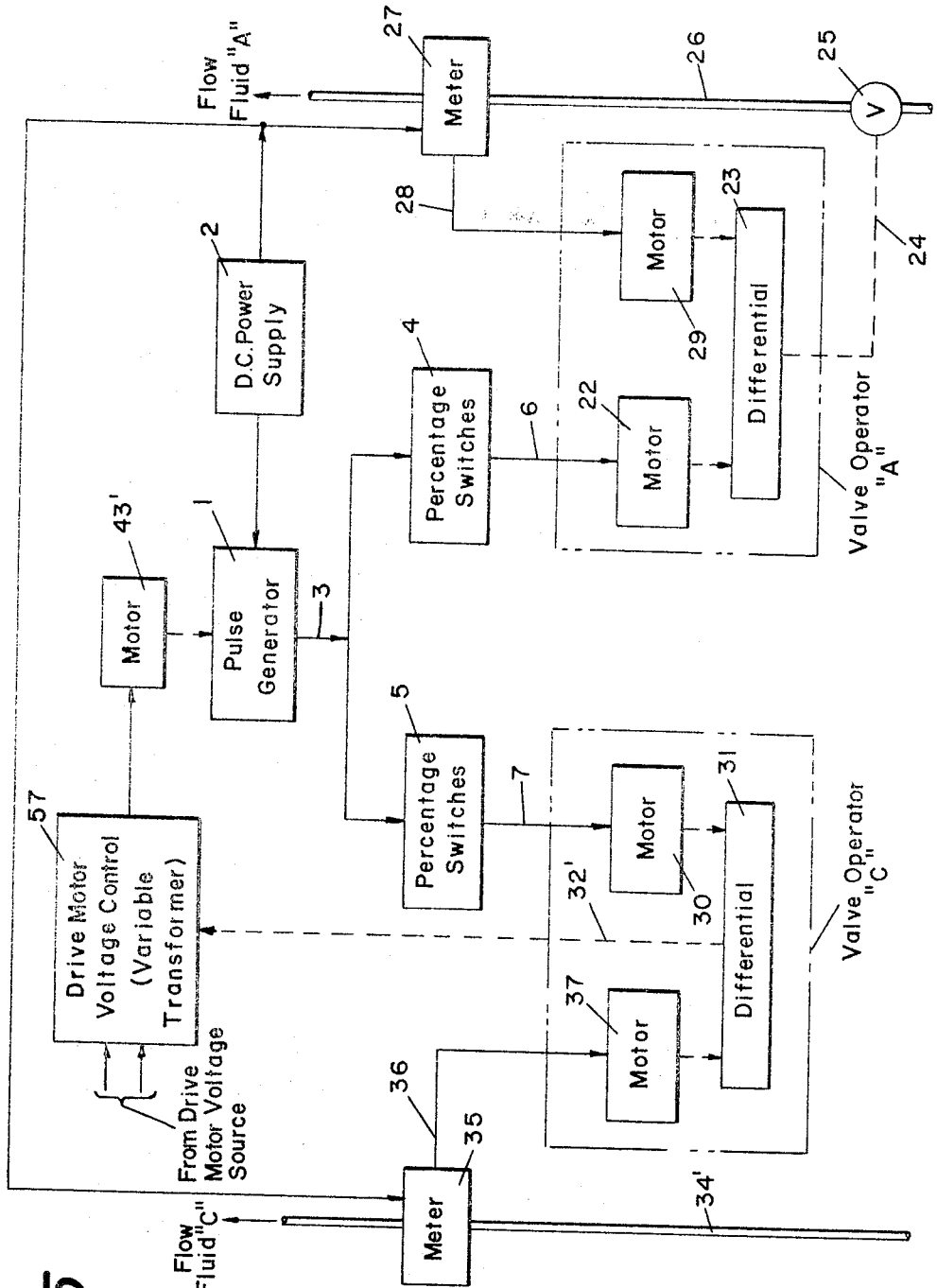

United States Patent Office 3,272,217
Patented Sept. 13, 1966

3,272,217
SYSTEMS FOR PROPORTIONING FLUIDS
Einar T. Young, Newton Square, Pa., assignor to Sun Oil Company, Philadelphia, Pa., a corporation of New Jersey
Filed Mar. 16, 1962, Ser. No. 180,211
17 Claims. (Cl. 137—101.19)

This invention relates to systems for proportioning fluids, and more particularly to systems for continuously proportioning two or more different fluids which are flowing in pipes or conduits. If all of these pipes eventually reach a common point such as a single container, a blend of the several different fluids will result; in this respect, the systems of the invention can be thought of as being applicable to blending.

This application is a continuation-in-part of my co-pending, but now abandoned application, Ser. No. 117,570, filed June 16, 1961.

An object of this invention is to provide novel fluid proportioning systems.

Another object is to provide improved fluid proportioning systems which use digital principles for their operation.

A further object is to provide novel fluid proportioning systems which are capable of operation with extreme accuracy, yet which are of relatively simple and inexpensive design.

The objects of this invention are accomplished, briefly, in the following manner: a master pulse generator, which generates pulses at an adjustable rate, provides the master control of the system. A plurality of controllers, one for each different fluid, receive pulses from the pulse generator; each of these controllers is adjustable manually to pass to its output a selected fraction of the total pulses generated. The pulses passed by each controller are applied to respective differential devices, in one particular sense. A separate metering device for each respective fluid generates pulses at a rate proportional to the flow rate of the corresponding fluid. The pulses generated by each metering device are also applied to the differential device for the corresponding fluid, in a sense opposite to that of the controller pulses for the same fluid. When the flow of a fluid is correct, the pulse rates of the two sets of pulses applied to the respective differential device match, and there is no output from the differential device. However, when the flow of a fluid varies from its correct value, the two pulse rates no longer match, and the corresponding differential device develops an output.

In one embodiment of the invention, the outputs of all the differential devices are applied each to a respective flow controlling device (such as a valve) for the respective fluid. Thus, in this one embodiment, all of the fluid streams are controlled, that is, maintained at their correct values.

In another embodiment, the outputs of all except one of the differential devices are applied each to a respective flow controlling device, in the same manner as in the first embodiment. However, the output of this one excepted differential device is applied to a speed control on the pulse generator, thereby to control the rate of generation of the pulses. Thus, in this other embodiment, one of the fluid streams is uncontrolled or "wild," but all the remaining streams are controlled.

A detailed description of the invention follows, taken in conjunction with the accompanying drawings, wherein:

FIG. 5 is a diagram similar to FIG. 1 but of another embodiment of the invention.

Figure 1:
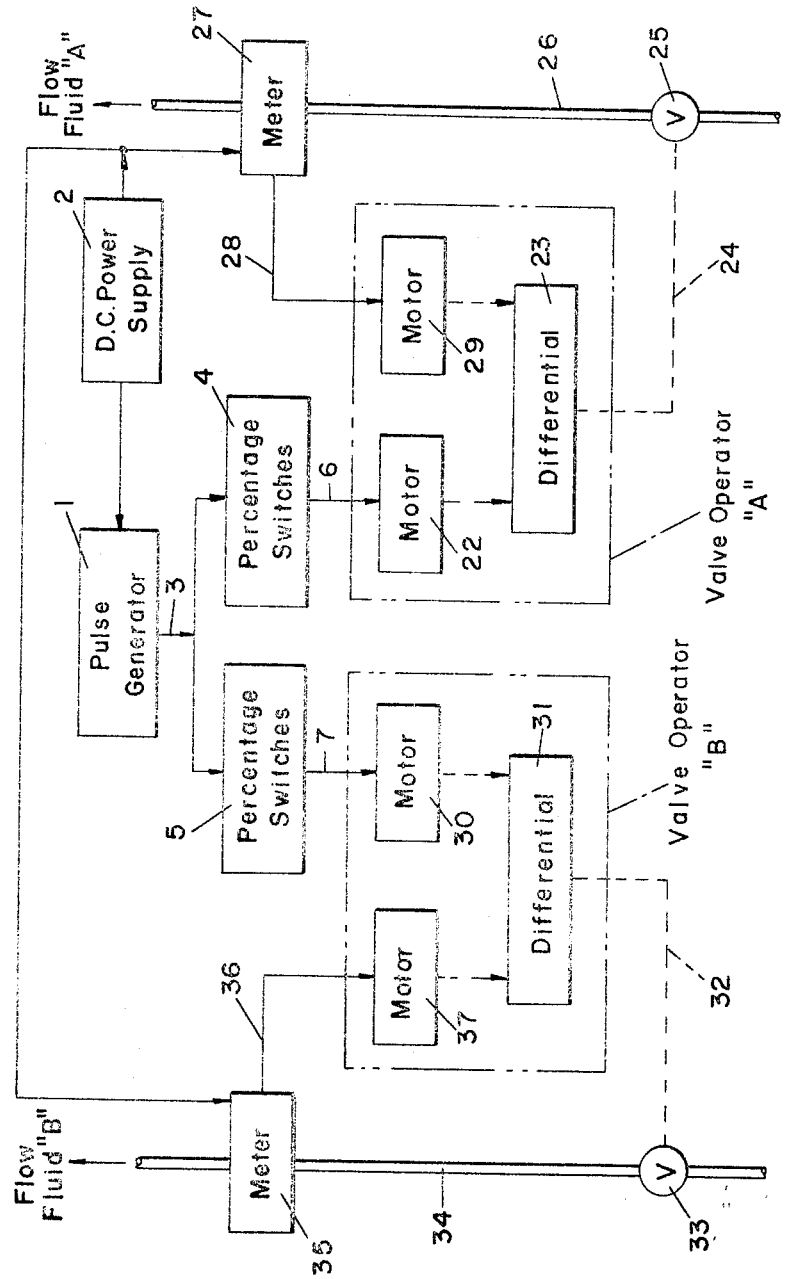
FIG. 1 is a simplified block diagram of one embodiment of a proportioning system according to this invention.

FIG. 1 illustrates a proportioning system according to the invention, that is to say, it illustrates one embodiment of the invention. A pulse generator 1 provides the master control for the proportioning system. Pulse generator 1 generally comprises a plurality of single-pole, single-throw switches all having their contacts fed, either directly or indirectly, from a direct current power supply 2. Each of the switches controls a separate series circuit from the power supply, so that the closure of any one of these switches results in a voltage pulse (derived from the power supply or power source 2) appearing at the pulse generator output, which latter is denoted generally by numeral 3. For simplicity, only a single output is shown for the pulse generator in FIG. 1, although, as will appear hereinafter, there are a multiplicity (actually, eight in number) of output terminals on pulse generator 1.

Figure 2:
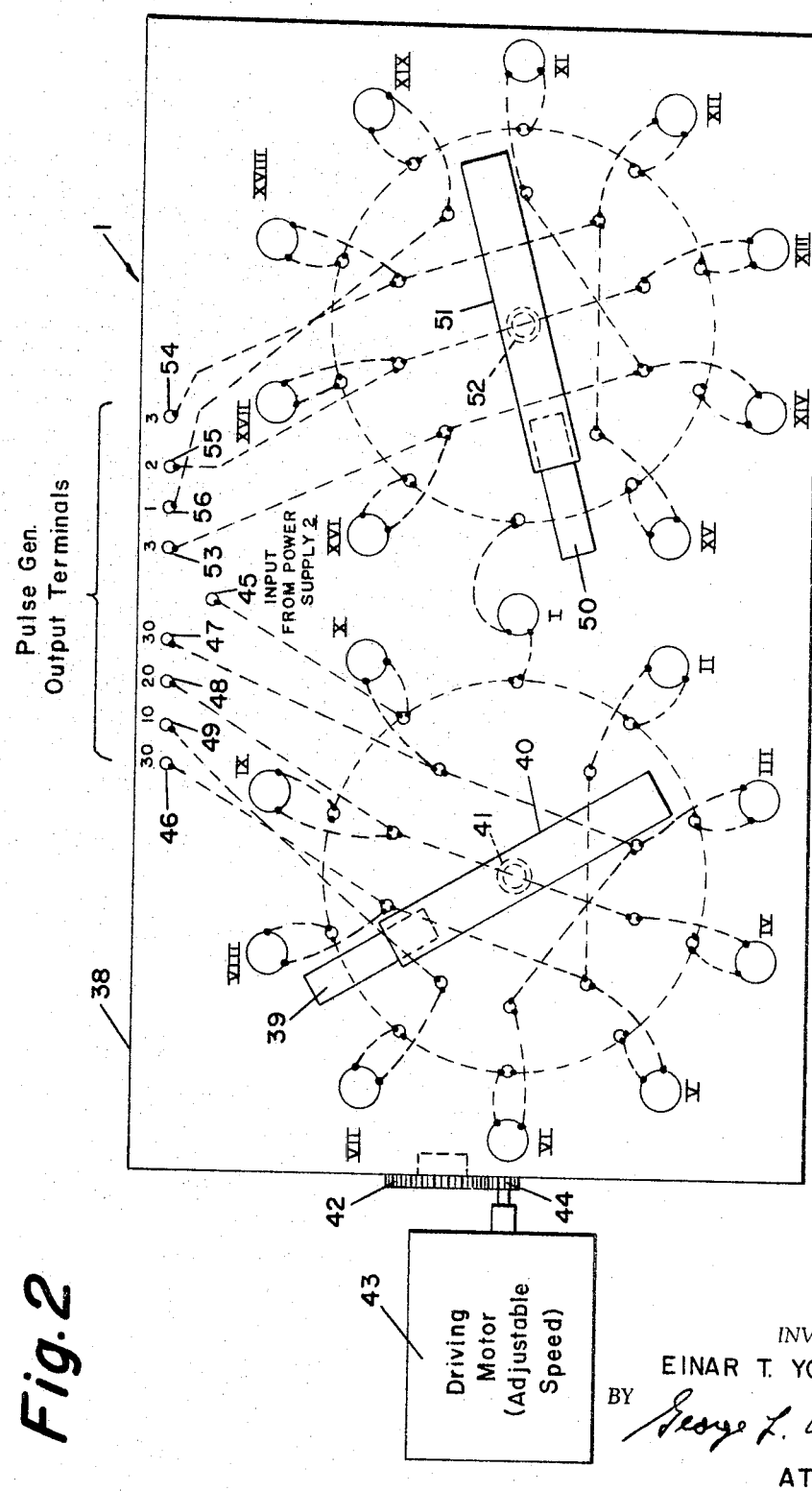
FIG. 2 is a top view, partly schematic, of a pulse generator.

Refer now to FIG. 2, which is a top view, partly schematic, of one form of pulse generator 1 which may be used in the proportioning system of this invention. A first group of ten single-pole, single-throw switches, numbered I through X, are arranged in a first circular array at one end of a flat plate 38, these switches being arranged equiangularly around the circumference of a circle and being mounted in upstanding relation on plate 38. These switches are preferably magnetically-operated switches of the so-called proximity type, and are generally cylindrical in outer configuration. They can be operated by bringing a permanent magnet into proximity with the switch; as the magnet approaches each switch it will first actuate the switch to a closed position, and as the magnet recedes the switch will be opened. A permanent magnet 39 is arranged to pass in front of the switches I through X, one at a time, in succession, closely adjacent the switches, to actuate these switches one at a time and in succession. This magnet is fastened to one outer end of a diametrically-extending arm 40 made of a suitable non-magnetic material. Arm 40 is mounted for rotation in a substantially horizontal plane, about an axis perpendicular to the plane of the paper and coincident with the center of the circle on which switches I through X are arranged, by means of a rotatable sleeve 41 to the lower end of which is keyed a driving worm wheel (not shown). This worm wheel is driven from a worm (not shown) which is keyed on a countershaft (not shown), which latter is in turn driven by a spur gear 42 keyed on the same countershaft. A driving motor 43, provided for the FIG. 1 embodiment with a suitable manual speed adjustment device, drives gear 42 by means of a spur gear 44 which is keyed to the output shaft of this motor. The various gear ratios are such that (assuming a speed of 3250 r.p.m. for the motor), the countershaft rotates at 600 r.p.m. and the arm 40 (and magnet 39) rotates at 120 r.p.m., past the switches I through X. The speed of driving motor 43 can be set or adjusted, in this embodiment, by the person operating the system. Thus, pulses are generated by generator 1 at a rate determined by the speed of driving motor 43.

One terminal of each of the switches I through X is connected to the input terminal 45, which latter is connected to the power source 2 (see FIG. 1). These connections are all illustrated by dotted lines, since they are on the under side of plate 38.

The remaining terminals of switches II, V, and VIII are parallel and connected to a pulse generator output terminal 46. During each revolution of magnet 39, each of these three switches will be closed in a regular order, resulting in the production of three spaced pulses at terminal 46; during a certain time interval which may be considered as a unit time interval and which corresponds to ten revolutions of magnet 39, thirty spaced pulses will appear at output terminal 46. Hence, terminal 46 is designated as "30."

The remaining terminals of switches III, VI, and X are paralleled and connected to a pulse generator output terminal 47. During each revolution of magnet 39, each of these three switches will be closed in a regular order, resulting in the production of three spaced pulses at terminal 47; during the unit time interval (for ten revolutions of magnet 39) thirty spaced pulses will appear at output terminal 47. Hence, terminal 47 is designated as "30."

The remaining terminals of switches IV and IX are paralleled and connected to a pulse generator output terminal 48. During each revolution of magnet 39, these two switches will be closed in a regular order, resulting in the production of two spaced pulses at terminal 48; during the aforesaid unit time interval, twenty spaced pulses will appear at output terminal 48. Hence, terminal 48 is designated as "20."

The remaining terminal of switch VII is connected to a pulse generator output terminal 49. During each revolution of magnet 39, switch VII will be closed, resulting in the production of one pulse at terminal 49; during the aforesaid unit time interval, ten spaced pulses will appear at output terminal 49. Hence, terminal 49 is designated as "10."

The group of thirty, ten, twenty, and thirty pulses (appearing at output terminals 46, 49, 48, and 47, respectively, during the aforesaid unit time interval) can be arranged to form a "tens" decade, the group totaling ninety pulses.

The switches I through X are spaced sufficiently far apart around the circle so that there is no overlapping between the actions of the various switches; that is to say, there is no simultaneous closing of any two or more of the switches, but each one is closed entirely separately from any other one.

A second group of nine single-pole, single-throw switches, numbered XI through XIX, are arranged in a second circular array at the other end of plate 38, these switches also being mounted in upstanding relation on plate 38. These switches are spaced 36° apart around the circumference of a circle, with one blank space since there are only nine switches in this group. Switches XI through XIX are likewise magnetically-operated switches of the so-called proximity type, similar in every respect to switches I through X previously described. A permanent magnet 50 is arranged to pass in front of the switches XI through XIX, one at a time, in succession, closely adjacent to the switches, to actuate these switches one at a time and in succession. Magnet 50 is fastened to one outer end of a diametrically-extending arm 51 made of a suitable non-magnetic material. Arm 51 is mounted for rotation in a substantially horizontal plane, about an axis perpendicular to the plane of the paper and coincident with the center of the circle on which switches XI through XIX are arranged, by means of a rotatable sleeve 52 to the lower end of which is keyed a driving worm wheel (not shown). This latter worm wheel is driven from a worm (not shown) which is keyed on the same countershaft previously referred to. However, the gear ratios of this latter worm and worm wheel are such that magnet 50 is driven at one-tenth the speed of the faster magnet 39; if the countershaft rotates at 600 r.p.m., as previously assumed by way of example, the arm 51 (and the magnet 50) rotates at 12 r.p.m., past the switches XI through XIX. Thus, during the aforesaid unit time interval (whose actual length is determinable and adjustable by adjustment of the speed of driving motor 43), the faster magnet 39 will make ten revolutions and the slower magnet 50, one revolution.

In order to prevent any overlapping of the longer pulses produced by the second group of (slower-operating) switches XI through XIX with the pulses produced by the first (faster-operating) switch group II through X, the switch I is connected in series between all of the switches XI through XIX and the power source 2. That is to say, pulses can be produced by any of the various switches XI through XIX only when switch I of the first group of switches is closed, which latter is closed only once during each revolution of the faster magnet 39. This is true even though switches XI through XIX each necessarily remain closed for a longer time than do switches II through X of the first switch group. The initial relative positioning of magnets 39 and 50 is such that magnet 50 will be in a position to operate one of switches XI through XIX every time that switch I is closed by magnet 39, except, of course, when magnet 50 is at the blank space in the second or right-hand circular switch array.

To implement the foregoing, one terminal of each of the switches XI through XIX is connected to that terminal of switch I which is opposite to the switch terminal connected directly to power input terminal 45, and thus said one terminal of each of switches XI through XIX is coupled (but of course only when switch I is closed) to power input terminal 45.

The remaining terminals of switches XI, XIV, and XVI are paralleled and connected to a pulse generator output terminal 53. During one revolution of magnet 50, each of these three switches will be closed in a regular order, resulting (but only during the time when switch I is also closed) in the production of three spaced pulses at terminal 53; thus, during the unit time interval (corresponding to one revolution of magnet 50) three spaced pulses will appear at output terminal 53. Hence, terminal 53 is designated as "3."

The remaining terminals of switches XII, XV, and XVIII are paralleled and connected to a pulse generator output terminal 54. During one revolution of magnet 50, each of these three switches will be closed in a regular order, resulting (but only during the time when switch I is also closed) in the production of three spaced pulses at terminal 54; thus, during the unit time interval (corresponding to one revolution of magnet 50) three spaced pulses will appear at output terminal 54. Hence, terminal 54 is designated as "3."

The remaining terminals of switches XIII and XVII are paralleled and connected to a pulse generator output terminal 55. During one revolution of magnet 50, these two switches will be closed in a regular order, resulting (but only during the time when switch I is also closed) in the production of two spaced pulses at terminal 55; thus, during the aforesaid unit time interval two spaced pulses will appear at output terminal 55. Hence, terminal 55 is designated as "2."

The remaining terminal of switch XIX is connected to a pulse generator output terminal 56. During one revolution of magnet 50, switch XIX will be closed, resulting (but only during the time when switch I is also closed) in the production of one pulse at terminal 56; thus, during the aforesaid unit time interval the pulse will appear at output terminal 56. Hence, terminal 56 is designated as "1."

The group of three, one, two, and three pulses (appearing at output terminals 53, 56, 55, and 54, respectively, during the aforesaid unit time interval) can be arranged to form a "units" decade, and the group totals nine pulses.

As an alternative to the preferred pulse generator construction described, a group of five linearly-disposed single-pole, single-throw switches could be mounted adjacent a faster rotatable drum, and a group of four linearly-disposed single-pole, single-throw switches could be mounted adjacent a slower rotatable drum, the faster drum being driven at ten times the speed of the slower drum. In this case, permanent magnets would be mounted in appropriate positions on the rotating drums, for actuation of the switches as the magnets pass the respective switches.

As previously stated, the driving motor 43 is provided with a manual speed adjustment means (by adjustment of which the speed of the motor output shaft can be varied over a range), for adjustment of the speed of the magnets 39 and 50, and consequent variation of the rate of generation of pulses. As the speed of the magnets is adjusted, the length of the unit time interval previously referred to (to wit, the time interval required for ten revolutions of magnet 39 and one revolution of magnet 50, resulting in the generation of a total of ninety-nine pulses, as above described) is correspondingly varied. As will become apparent hereinafter, the length of this unit time interval determines or presets the rate at which a combined quantity of fluids is fed through all the pipes or conduits controlled by the proportioning system of this invention.

Figure 3:
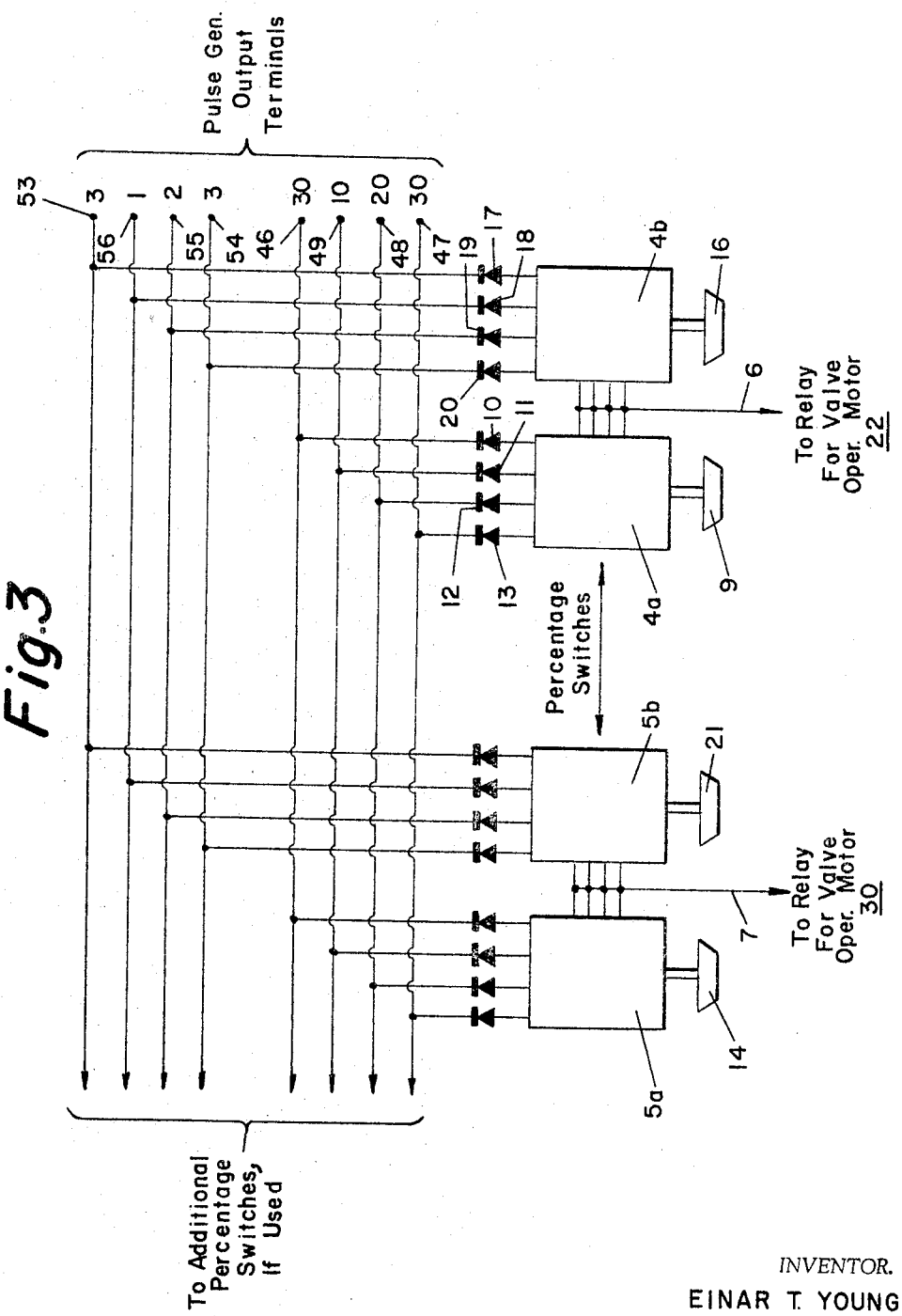
FIG. 3 is a wiring diagram of a portion of the FIG. 1 system.
Figure 4:
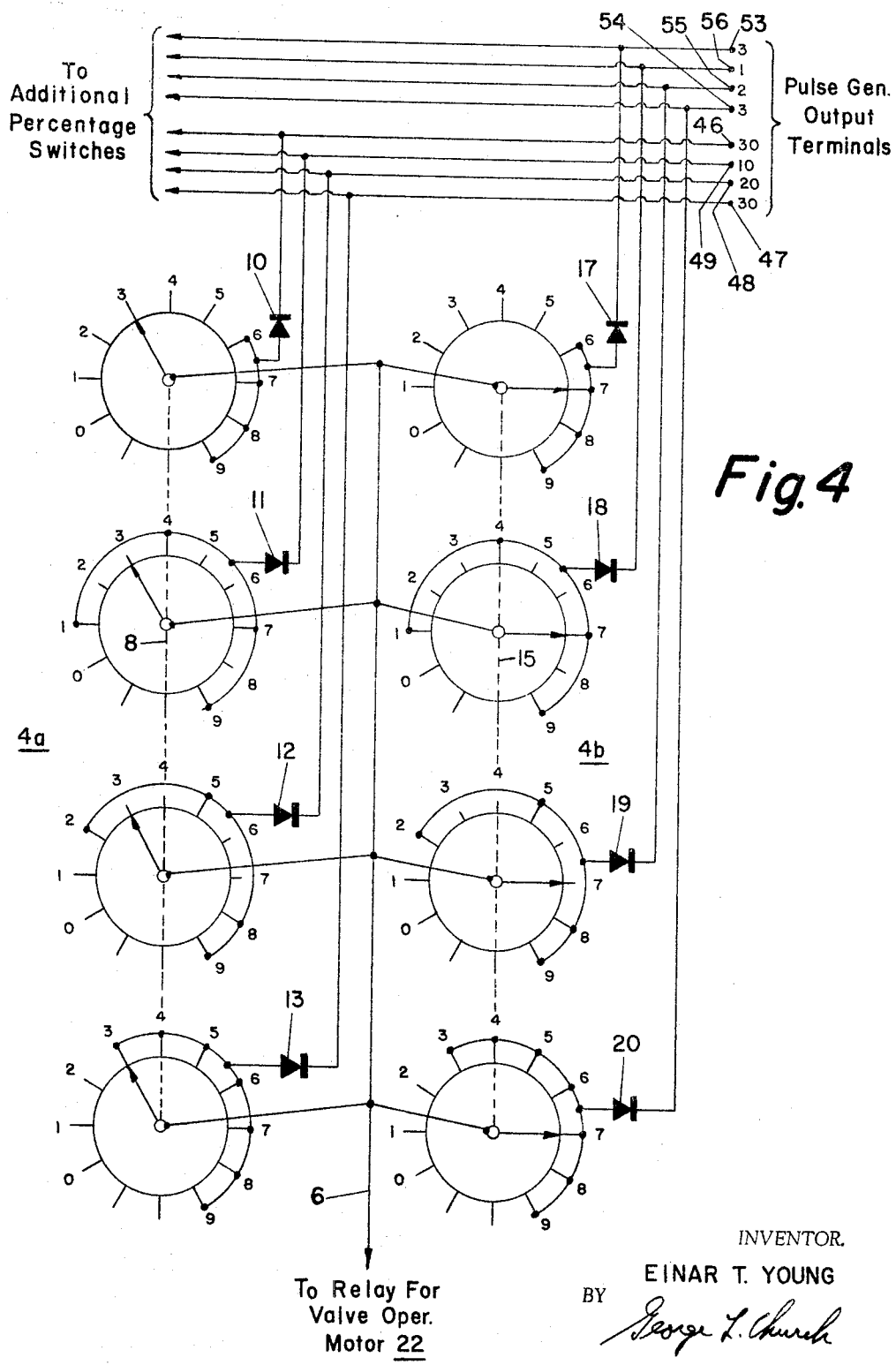
FIG. 4 is a wiring diagram of a pair of percentage switches.

As previously described, the pulse generator output 3 (FIG. 1) actually comprises a set of eight output terminals 46–49 and 53–56, at each of which appears, during the unit time interval, the respective number of pulses indicated in FIGS. 2–4. Speaking somewhat generally, each of these pulses results from the closure (by one of the switches in generator 1) of a circuit extending from power supply 2 to the respective pulse generator output terminal.

Refer again to FIG. 1. Pulses from the pulse generator 1 are fed to a first pair 4 of percentage switches which comprise a controller for a first fluid "A," and also to a second pair 5 of percentage switches which comprise a controller for a second fluid "B." Preferably, the pulse generator 1, the percentage switches 4, and the percentage switches 5 are all located at a central control location. For purposes of simplicity, in FIG. 1 there is illustrated a fluid proportioning system for only two different fluids. However, the concept of this invention is readily applicable to a greater number of different fluids that two. In the latter case, an additional pair of percentage switches, each similar to those denoted by 4 and 5 (which will be described in detail hereinafter), would be utilized for each different fluid, each such pair of switches comprising a controller for its respective fluid. All of such additional switches would be fed from the common pulse generator 1, and all of these additional switches would be located at the same central control location.

Now refer to FIG. 3. The percentage switches 4a and 4b together comprise the first pair 4 of percentage switches. Switch 4a is coupled to the "30," "10," "20," and "30" pulse generator output terminals, while switch 4b is coupled to the "3," "1," "2," and "3" pulse generator output terminals. The switches 4a and 4b have a common output connection or lead 6. The percentage switches 5a and 5b together comprise the second pair 5 of percentage switches. Switch 5a is coupled to the "30," "10", "20," and "30" pulse generator output terminals, while switch 5b is coupled to the "3," "1," "2," and "3" pulse generator output terminals. The switches 5a and 5b have a common output connection or lead 7.

Refer now to FIG. 4, which is a detailed wiring diagram of the percentage switch 4a and 4b. The percentage switches 5a and 5b, and any other percentage switch pairs which may be utilized, are all wired in an exactly similar manner. Speaking generally, the percentage switches 4a and 4b function to pass to the switch output lead 6, during each unit time interval, only a selected fraction of the total number of pulses (ninety-nine in total number) generated by generator 1 during this same time interval. These switches are manually adjustable to pass on any whole number (from one through ninety-nine) of these pulses.

Switch 4a, of a commercially-available type, has four levels, decks, or wafers, in each of which there is a rotatable contact selectively engageable with eleven fixed contacts, only nine of the eleven fixed contacts in each deck being utilized in this invention. The rotatable contacts of all four decks are mechanically ganged together, as indicated at 8, and are operated by a common knob 9 (see FIG. 3). The numbers "1" through "9" around the peripheries of the decks of switch 4a (FIG. 4) denote the fixed contacts in the decks, and represent the "tens" digits, from ten through ninety. The "0" prior to "1" represents zero.

In the first or uppermost deck of switch 4a, the sixth through the ninth fixed contacts are connected together and through a diode 10 to output terminal 46 of the pulse generator, so that during each unit time interval thirty pulses are supplied to these contacts. In the second deck of switch 4a, the first, fourth, seventh, and ninth fixed contacts are connected together and through a diode 11 to the "10" output terminal of the pulse generator, so that during each unit time interval ten pulses are supplied to these contacts. In the third deck of switch 4a, the second, fifth, eighth, and ninth fixed contacts are connected together and through a diode 12 to the "20" output terminal of the pulse generator, so that during each unit time interval twenty pulses are supplied to these contacts. In the fourth or lowermost deck of switch 4a, the third through the ninth fixed contacts are connected together and through a diode 13 to output terminal 47 of the pulse generator, so that during each unit time interval thirty pulses are supplied to these contacts. The diodes 10 through 13 are poled in a direction to pass the voltage pulses to the switch contacts; these diodes prevent undesired signal coupling between the several switches which are connected to the same output terminal of the pulse generator. None of the "0" fixed contacts are connected to the pulse generator.

All four rotatable contacts of switch 4a are electrically connected together and to the switch output lead 6. By manual operation of knob 9, which rotates the rotatable contacts of this switch, any selected number of tens of pulses (from ten up to and including ninety, and including zero) may be passed on from pulse generator 1 to switch output lead 6, during each unit time interval. As illustrated in FIG. 4, the contacts of switch 4a are set on digit "3," which means that thirty pulses (as keyed by generator 1 from power source 2) will in this case appear on switch output lead 6 during the aforesaid unit time interval (i.e., the interval required for ten revolutions of the faster drum in generator 1). As illustrated, the thirty pulses supplies from output terminal 47 of the pulse generator pass through diode 13 to the fourth or lowermost deck of switch 4a, and through fixed contact "3" of this deck to the rotatable contact of this deck and thence to output lead 6. Thus, for this switch setting thirty pulses are passed on to lead 6 by switch 4a. Other fixed contacts of switch 4a are operative for other "tens" settings of this switch. Switch 4a is therefore the "tens" digit switch of the pair 4 of percentage switches.

Switch 5a is the "tens" digit switch of the pair 5 of percentage switches, and the rotatable contacts of this switch are operated by a common knob 14 (FIG. 3). Switch 5a is constructed and connected in exactly the same manner as switch 4a, previously described, using similarly-arranged diodes, etc. By manual operation of knob 14, any selected number of tens of pulses may be passed on from pulse generator 1 to switch output lead 7, during each unit time interval. Any additional "tens" digit percentage switches, if used, are also constructed and connected in exactly the same manner as switch 4a.

Switch 4b is similar in construction to switch 4a; here, again, the four rotatable contacts are mechanically ganged together, as indicated at 15, and are operated by a common knob 16 (see FIG. 3). The numbers "1" through "9" around the peripheries of the decks of switch 4b (FIG. 4) denote the fixed contacts in the decks, and represent the "units" digits, one through nine. The "0" prior to "1" represents zero.

In the first or uppermost deck of switch 4b, the sixth through the ninth fixed contacts are connected together and through a diode 17 to output terminal 53 of the pulse generator, so that during each unit time interval three pulses are supplied to these contacts. In the second deck of switch 4b, the first, fourth, seventh, and ninth fixed contacts are connected together and through a diode 18 tot he "1" output terminal of the pulse generator, so that during each unit time interval one pulse is applied to these contacts. In the third deck of switch 4b the second, fifth, eighth, and ninth fixed contacts are connected together and through a diode 19 to the "2" output terminal of the pulse generator, so that during each unit time interval two pulses are supplied to these contacts. In the fourth or lowermost deck of switch 4b, the third through the ninth fixed contacts are connected together and through a diode 20 to output terminal 54 of the pulse generator, so that during each unit time interval three pulses are supplied to these contacts. The diodes 17 through 20, like the diodes 10 through 13, are poled in a direction to pass the voltage pulses to the switch contacts; diodes 17 through 20 likewise prevent undesired signal coupling between the several switches which are connected to the same output terminal of the pulse generator. None of the "0" fixed contacts are connected to the pulse generator.

All four rotatable contacts of switch 4b are electrically connected together and to the switch output lead 6. By manual operation of knob 16, which rotates the rotatable contacts of this swich, any selected unit number of pulses (from one up to an including nine, and including zero) may be passed on from pulse generator 1 to switch output lead 6, during each unit time interval. As illustrated in FIG. 4, the contacts of switch 4b are set on digit "7" which means that seven pulses (as keyed by generator 1 from power source 2) will in this case also appear on switch output lead 6 (in addition to the thirty pulses previously mentioned, as governed by the setting of switch 4a) during the aforesaid unit time interval (i.e., the interval required for one revolution of the slower drum in generator 1). As illustrated, the three pulses supplied from output terminal 53 of the pulse generator pass through diode 17 to the first or uppermost deck of switch 4b, and through fixed contact "7" of this deck to the rotatable contact of this deck and thence to output lead 6; also, the one pulse supplied from the "1" output terminal of the pulse generator passes through diode 18 to the second deck of switch 4b, and by way of contact "7" of this deck and the rotatable contact thereof to output lead 6; also, the three pulses supplied from output terminal 54 of the pulse generator pass through diode 20 to the fourth or lowermost deck of switch 4b, and by way of contact "7" of this deck and the rotatable contact thereof to output lead 6; this makes a total of seven pulses supplied by switch 4b to output lead 6, during the aforesaid unit time interval. Other fixed contacts of switch 4b are operative for other "units" settings of this switch. Switch 4b is therefore the "units" digits switch of the pair 4 of percentage switches.

The arrangement of switches and switch actuators in the pulse generator 1 (employing switch I, as previously described in connection with FIG. 2) is such that none of the ninety-nine pulses generated during the unit time interval overlaps any other pulse. Therefore, for the switch settings (of switches 4a and 4b) illustrated in FIG. 4, a total of thirty-seven pulses will appear on switch output lead 6 during each unit time interval; of this total, thirty pulses are supplied via switch 4a and seven pulses via switch 4b. It may be seen that the pair of switches 4a and 4b are related to each other in decade fashion, and that by proper manual operation (manipulation of knobs 9 and 16), any whole number (from one through ninety-nine) of pulses may be caused to appear on switch output lead 6, during each unit time interval.

Switch 5b is the "units" digit switch of the pair 5 of percentage switches, and the rotatable contacts of this switch are operated by a common knob 21 (FIG. 3). Switch 5b is constructed and connected in exactly the same manner as switch 4b, previously described, using similarly-arranged diodes, etc. By manual operation of knob 21, any selected unit number of pulses may be passed on from pulse generator 1 to switch output lead 7, during each unit time interval. Any additional "units" digit percentage switches, if used, are also constructed and connected in exactly the same manner switch 4b.

The switch pairs 4 and 5, and any other switch pairs which may be employed, are set up to operate as percentage switches, the total settings of all such switches being ordinarily adjusted so that the sum of all the switch settings is one hundred. In this case, the percentage switches may be set so that each component fluid may be made to constitute a certain percentage of the total of all components, by setting this same percentage number on its corresponding pair of percentage switches. For example, if only two different fluids are being proportioned (as illustrated in FIG. 1), and if the switches 4a and 4b (for fluid "A") are set at "37" (as illustrated in FIG. 4, and which may be thought of as representing 37%), then switch 5a would be set at "6" (representing 60) and switch 5b at "3," to give a reading of "63" on switch pair 5. Then, during each unit time interval, sixty-three pulses would appear on switch output lead 7, and, as previously described, thirty-seven pulses would appear on switch output lead 6.

Refer again to FIG. 1. The pulses appearing on switch output lead 6 are fed to the energizing winding of a valve operator motor relay (not shown), for example of the so-called mercury-wetted type, which operates once for each pulse to complete (in pulse fashion) an energizing circuit for a stepping motor 22 in the valve operator "A." It will be recalled that the pulses used to operate the aforesaid motor relay are derived from power source 2, by way of master pulse generator 1 and the percentage switch pair 4. By means of the aforesaid motor relay, energizing pulses are provided (under the selective control of the station controller or percentage switch pair 4) for the motor 22. Motor 22 is of the stepping type, turning one revolution for each one hundred electrical pulses supplied thereto.

The motor 22 is connected through suitable gearing to one input side of a subtractive-type differential 23 in the aforesaid valve operator. The differential 23 has two mechanical inputs and one output shaft. The output shaft 24 of the differential (which shaft is illustrated schematically in FIG. 1) is connected through suitable gearing to the operating shaft (stem) of a valve 25 which requires rotary motion for its operation and which is inserted in the flow conduit 26 for fluid "A." Fluid "A" flows through conduit 26 in the direction indicated by the arrow in FIG. 1. The motor 22, acting through differential 23, tends to open valve 25, by way of shaft 24. Valve 25 serves as a flow controlling device for fluid "A."

In the same conduit as valve 25, but downstream from this valve, is a flowmeter 27 which senses the flow of fluid through conduit 26. Flowmeter 27 may be of the positive displacement type, having as a part of its readout mechanism a set of contacts electrically connected to power source 2 and operated (by the flowmeter moving element) at a rate proportional to the fluid flow rate through the meter 27 and conduit 26. Alternatively, it may comprise a so-called "metering pump" having a set of contacts similarly electrically connected and operated; in this case, the "metering pump" (which has a readily-adjustable pumping rate) performs the functions of both of flowmeter and a valve, so that the valve 25 as such could be eliminated, the differential output 24 then controlling the "metering pump" to control the flow of fluid in conduit 26. Alternatively, a turbine-type flowmeter, such as that disclosed in my copending application, Ser. No. 121,239, filed June 30, 1961, which ripened on June 9, 1964 into Patent No. 3,136,159, could be used at 27. Such a flowmeter generates pulses, independently of any external power source, at a rate proportional to the fluid flow being metered; these pulses can be readily amplified.

In any event, and no matter what type of flowmeter is used at 27, pulses are produced by the metering device (flow sensing device) at a rate proportional to the fluid flow rate through the metering device (and through the conduit 26). These pulses appear at the output 28 of the flowmeter and are fed to the energizing winding of a valve operator motor relay (not shown), for example of the so-called mercury-wetted types, which operates once for each such pulses to complete (in pulse fashion) an energizing circuit for a second stepping motor 29 in the valve operator "A." By means of the aforesaid motor relay, energizing pulses are provided (under the control of the flowmeter 27) for the motor 29. Motor 29, like motor 22, is of the stepping type, turning one revolution for each one hundred electrical pulses supplied thereto.

The motor 29 is connected through suitable gearing to the second input side of differential 23 in valve operator "A." The motor 29, acting through differential 23, tends to close the valve 25.

The valve operator "A" (comprising elements 22, 23, and 29, plus gearing, etc.) will not be described hereinafter in detail, since it forms no part of the present invention. This valve operator is disclosed and claimed in my copending application, Ser. No. 133,075, filed Aug. 22, 1961.

The differential 23, as previously stated, subtracts the rotations of the two motors 22 and 29. If these motors are rotating at the same speed, there will be no rotation of output shaft 24, and consequently no movement of valve 25. If, however, one motor rotates faster than the other, then shaft 24 will rotate and the valve 25 will open or close, depending on which motor is rotating the faster. Specifically, if motor 22 rotates faster than motor 29, shaft 24 will rotate in such a direction as to open valve 25; if motor 29 rotates faster than motor 22, shaft 24 will rotate in such a direction as to close valve 25.

At the start of a delivery of fluid, valve 25 will be closed and no pulses will come from the meter 27, so that motor 29 is then stationary. When the pulse generator 1 is switched on, pulses will appear at switch output 6, and motor 22 will start to open the valve. Since motor 29 is then stationary, valve 25 will open at its maximum rate. As the valve opens, fluid "A" will flow through conduit 26 and pulses from meter 27 will cause motor 29 to rotate, slowing down the opening of valve 25. When the two motors 22 and 29 finally are receiving pulses at the same rate, the valve will stop opening, and will remain in that position.

If, however, changes in fluid pressure tend to change the flow rate through conduit 26 and meter 27, the change in the pulse rate from this meter will result in adjustment of the valve 25 to a new position. The result is that the flow rate of fluid "A" will be exactly controlled by the pulse generator 1, acting through percentage switch pair 4 and valve operator "A."

Summarizing the foregoing, the action of the system components causes the valve 25 to be brought to a position where the fluid flow rate through flowmeter 27 (and through the valve 25 and conduit 26) is such that the pulse rate (in pulses per second) from the meter 27 matches exactly the pulse rate from the percentage switches 4. At that time, the two motors 22 and 29 will be running at the same speed, and there will be no output from the subtracting differential 23 to change the position of valve 25. At this position, then, the flow rate of the fluid "A" stream will be exactly proportional to the pulse rate of pulse generator 1 multiplied by the setting of the percentage switches 4.

The components numbered 1, 4, 22, 23, 25, 27, and 29 comprise a complete flow control system, for fluid "A." It should be noted that the system is "fail-safe," in that if the pulse generator 1 fails for any reason (which failure would tend to cause control of the flow of fluid to be lost), pulses will not be received by motor 22, resulting in stopping of this motor and consequent closing of valve 25 by motor 29. This shuts off the flow of fluid in conduit 26.

If a second, or any reasonable number, of flow control systems similar to the one referred to in the preceding paragraph is connected to the same pulse generator 1, a proportioning system is provided. The description of one embodiment of such a proportioning system, for two fluids, will now be completed.

The pulses appearing on switch output lead 7 are fed to the energizing winding of a valve operator motor relay (not shown), which latter may be like the similarly-designated relay referred to previously in connection with percentage switches 4 and switch output lead 6. By means of the relay coupled to output lead 7, an energizing circuit (operating in pulse fashion, one motor energizing pulse for each pulse on lead 7) is completed for a stepping motor 30 in the valve operator "B." The pulses used to operate the motor relay for fluid "B" are derived from power source 2, by way of master pulse generator 1 and percentage switch pair 5. By means of this last-mentioned motor relay, energizing pulses are provided (under the selective control of the station controller or percentage switch pair 5) for the motor 30. Motor 30 is of the stepping type, and is preferably exactly similar in construction to motor 22, previously described.

The motor 30 is connected through suitable gearing to one input side of a subtractive-type differential 31 in valve operator "B." Differential 31 has two mechanical inputs and one output shaft. The output shaft 32 of differential 31 (which shaft is illustrated schematically in FIG. 1) is connected through suitable gearing to the operating shaft (stem) of a valve 33 which requires rotary motion for its operation and which is inserted in the flow conduit 34 for fluid "B." Fluid "B" flows through conduit 34 in the direction indicated by the arrow of FIG. 1. The motor 30, acting through differential 31, tends to open valve 33, by way of shaft 32. Valve 33 serves as a flow controlling device for fluid "B."

In the same conduit as valve 33, but downstream from this valve, is a flowmeter 35 which senses the flow of fluid through conduit 34. Flowmeter 35 may be of any of the types previously mentioned in connection with meter 27. Flowmeter 35 senses the flow through conduit 34 and (just as does meter 27 for its conduit 26) produces pulses at a rate proportional to the fluid flow rate through conduit 34. Preferably, the meters 27 and 35 (and any other flowmeters which may be used in a proportioning system) all produce the same number of pulses per gallon of fluid. The pulses appearing at the output 36 of flowmeter 35 are fed to the energizing winding of a valve operator motor relay (not shown), which latter may be like the similarly-designated relay referred to previously in connection with flowmeter 27 and flowmeter output 28. By means of the relay coupled to output 36, an energizing circuit (operating in pulse fashion, one motor energizing pulse for each pulse at output 36) is completed for a stepping motor 37 in valve operator "B." By means of this last-mentioned relay, energizing pulses are provided (under the control of the flowmeter 35) for the motor 37. Motor 37 is of the stepping type, and is preferably exactly similar in construction to motor 29, previously described.

The motor 37 is connected through suitable gearing to the second input side of differential 31 in valve operator "B." The motor 37, acting through differential 31, tends to close the valve 33.

The valve operator "B" is preferably exactly similar in construction to the valve operator "A."

The differential 31, as previously stated, subtracts the rotations of the two motors 30 and 37. If these motors are rotating at the same speed, there will be no rotation of output shaft 32, and consequently no movement of valve 33. If, however, one motor rotates faster than the other, then shaft 32 will rotate and the valve 33 will open or close, depending on which motor is rotating the faster.

The action here is quite similar to that in valve operator "A," previously described. The flow rate of fluid "B" will be exactly controlled by the pulse generator 1, acting through percentage switch pair 5 and valve operator "B." The valve 33 will seek a position where the flow rate through meter 35 is such that the pulse rate (in pulses per second) from this meter matches exactly the pulse rate from the percentage switches 5. At that time the motors 30 and 37 will be running at the same speed, and there will be no output from the subtracting differential 31 to change the position of valve 33. At this position, then, the flow rate of fluid "B" will be exactly proportional to the pulse rate of pulse generator 1 multiplied by the setting of the percentage switches 5.

If the pulses per gallon of flowmeters 27 and 35 are the same, then the actual percentage (of the total flow rate) for each component fluid "A" or "B" will be its switch setting (on 4 or 5, respectively) divided by the total of both percentage switch settings. It is convenient but not necessary to adjust the percentage switches so that the total of both settings is one hundred. In this case, of course, the percentage of each component is read directly.

The total flow rate of both components is governed and determined by the pulse rate of pulse generator 1, that is, by the length of the unit time interval required for the generation of the fixed number (ninety-nine) of pulses. By varying the speed of the pulse generator driving motor, this time interval may be varied in length, to vary the pulse rate of pulse generator 1. It has been found that a practical upper limit on the pulse rate of generator 1 is twenty pulses per second.

If more than two fluids are to be proportioned, a separate flowmeter, valve, valve operator, and pair of percentage switches is utilized for each respective fluid; these items would be exactly similar to elements 27, 25, valve operator "A," and 4, respectively, and all of the percentage switches would be coupled to receive pulses from the single common or master pulse generator 1. In this case, if the pulses per gallon of all the flowmeters are the same, then the actual percentage for each component fluid will be its respective percentage switch setting divided by the total of all the percentage switch settings.

According to this invention, all of the percentage switch pairs receive pulses from the same single master pulse generator 1. Since the flow rate of each fluid stream, according to this first embodiment of the invention, is maintained exactly proportional to the pulse rate of the (common) pulse generator multiplied by the setting of the respective percentage switch pair, an extremely accurate and convenient proportioning system results.

In some cases, it may be impractical to control (as by means of a valve in the flow conduit, which valve is controlled or operated by a valve operator unit in the manner previously described) one of the fluid streams. For example, one fluid stream (with which other fluids are to be blended) may constitute the entire output of a continuously-operating process unit; such a stream cannot be regulated or controlled as to flow, since to do so would interfere with proper operation of the unit and process. A proportioning system applicable to such situations will next be described, in connection with FIG. 5. In this second embodiment of the invention, one of the fluid streams is uncontrolled or "wild," but all the remaining or other streams are controlled.

FIG. 5 illustrates another proportioning system according to the invention, that is to say, it illustrates another embodiment of the invention. In FIG. 5, elements the same as those of FIG. 1 are denoted by the same reference numerals, while functionally similar elements are denoted by the same reference numerals but primed.

In FIG. 5, the driving motor 43′ drives pulse generator 1 so that (just as previously described in connection with FIG. 2) pulses are generated by generator 1 at a rate determined by the speed of this motor. In order to enable variation or control of the speed of motor 43′, the voltage source (not shown) for this drive motor supplies voltage thereto through a voltage control device or unit 57, e.g. a variable transformer having a mechanically movable contactor of the potentiometric type incorporated therein. The movable element of the drive motor voltage control 57 is coupled to the output shaft 32′ of the subtractive-type differential 31 in valve operator "C." This coupling is so arranged that the mechanical output of differential 31 controls the voltage on the pulse generator drive motor 43′. Thus, the speed of motor 43′ (and hence the pulse generation rate of pulse generator 1) is under the control of, and is responsive to, the output of differential 31.

Pulses used to energize the stepping motor 30 of valve operator "C" are derived from pulse generator 1 by way of the percentage switches 5, just as for valve operator "B" in FIG. 1. Motor 30 again provides one mechanical input to subtractive-type differential 31. As previously stated, the output shaft 32′ of differential 31 is coupled through suitable gearing to the drive motor voltage control device 57, to control the drive motor voltage for the pulse generator.

Fluid "C" flows through conduit 34′ in the direction indicated by the arrow in FIG. 5. There is no valve in the conduit or pipe 34′, so that the fluid "C" which flows through this conduit is uncontrolled or "wild." In conduit 34′ is a flowmeter 35 which senses the flow of fluid "C" through such conduit. Flowmeter 35 produces pulses at a rate proportional to the fluid flow rate through conduit 34′, and the pulses appearing at the output 36 of this flowmeter are used to energize the stepping motor 37 of valve operator "C." Motor 37 provides the second mechanical input to differential 31.

The differential 31 subtracts the rotations of the two motors 30 and 37. If these motors are rotating at the same speed due to their receiving pulses at the same rate, there will be no rotation of output shaft 32′, and consequently no variation of the pulse rate of pulse generator 1. Since the motors 30 and 37 are then receiving pulses at the same rate, the pulse rate of pulse generator 1 is established at a value which is proportional to the rate of fluid flow through conduit 34′, the factor of proportionally being established by the setting of percentage switches 5.

If, however, the flow rate through conduit 34′ and meter 35 changes, the change in the pulse rate from this meter will result in a variation of the pulse rate of pulse generator 1 to a new value such that it is proportional to the new rate of flow, the factor of proportionality remaining the same. This last action is caused by the rotation of motors 30 and 37 at different speeds (due to the changed pulse rate from flowmeter 35), and the consequent rotation of differential output shafts 32′ to vary the pulse rate of pulse generator 1 (by means of the pulse generator drive motor voltage control effected by this shaft).

The result is that the pulse rate of pulse generator 1 will be maintained exactly proportional to the rate of flow of the "wild" stream in conduit 34′. That is to say, the pulse rate of pulse generator 1 is maintained at a value such that the pulse rate (in pulses per second) from percentage switches 5 matches exactly the pulse rate from the flowmeter 35. At said value, the pulse rate of pulse generator 1 multiplied by the setting of the percentage switches 5 will be exactly proportional to the flow rate of the "wild" stream, fluid "C."

In FIG. 5, the valve operator "A" functions in the same manner as previously described in connection with FIG. 1. The valve 25 is brought to a position where the fluid flow rate through flowmeter 27 (and through the valve 25 and conduit 26) is such that the pulse rate (in pulses per second) from the meter 27 matches exactly the pulse rate from the percentage switches 4. At this position of the valve 25, the flow rate of the fluid "A" stream will be exactly proportional to the pulse rate of pulse generator 1 multiplied by the setting of percentage switches 4.

Since the pulse rate of pulse generator 1 is maintained (by the action of valve operator "C") exactly proportional to the flow rate of the "wild" stream, fluid "C," and since the flow rate of stream "A" is maintained (by the action of valve operator "A") exactly proportional to the pulse rate of pulse generator 1, it may be seen that in the system of FIG. 5 the flow rate of stream "A" is maintained exactly proportional to the flow rate of the "wild" stream, fluid "C," The result here is that the percentage of fluid "C" in the combined or blended output of the two streams "A" and "C" is established by the setting of percentage switches 5, and the percentage of fluid "A" in the combined or blended output of the two streams is established by the setting of percentage switches 4.

The embodiments of the invention in which an exclusive property or privilege is claimed are defined as follows:

1. An apparatus for proportioning a plurality of materials, comprising a plurality of stations one for each different material; means at each station for sensing the flow of the respective material through the station and providing an output proportional to such flow; a master pulse generator for all of said stations operating to generate a fixed total number of pulses during a time interval whose length is controllable; a controller for each and every one of said stations, each of said controllers being coupled to receive pulses from said pulse generator and each being manually adjustable to pass to its output, during said time interval, only a selected fraction of said total number of pulses; means at each station save a first responsive to the outputs of the respective sensing means and of the respective controller for controlling the flow of material through the corresponding station; and means responsive to the outputs of the sensing means for said first station and of the corresponding controller for controlling the length of said time interval.

2. Apparatus in accordance with claim 1, wherein the last-mentioned means is operatively coupled to said pulse generator to control the pulse generation rate thereof.

3. Apparatus in accordance with claim 1, wherein the output of each sensing means comprises a series of pulses whose repetition rate is proportional to the rate of material flow through the corresponding station.

4. Apparatus in accordance with claim 1, wherein the output of each sensing means comprises a series of pulses whose repetition rate is proportional to the rate of material flow through the corresponding station, and wherein the last-mentioned responsive means is operatively coupled to said pulse generator to control the pulse generation rate thereof.

5. An apparatus for proportioning a plurality of materials, comprising a plurality of stations one for each different material; means at each station for sensing the flow of the respective material through the station and providing an output proportional to such flow; a mechanically-driven master pulse generator for all of said stations operating to generate a fixed total number of pulses during a time interval, the drive speed of said generator being controllable to control the length of such time interval; a controller for each and every one of said stations, each of said controllers being coupled to receive pulses from said pulse generator and each being manually adjustable to pass to its output, during said time interval, only a selected fraction of said total number of pulses; means at each station save a first responsive to the outputs of the respective sensing means and of the respective controller for controlling the flow of material through the corresponding station; and means responsive to the outputs of the sensing means for said first station and of the corresponding controller for controlling the drive speed of said generator.

6. Apparatus in accordance with claim 5, wherein the output of each sensing means comprises a series of pulses whose repetition rate is proportional to the rate of material flow through the corresponding station.

7. An apparatus for proportioning a plurality of materials, comprising a plurality of stations one for each different material; means at each station for sensing the flow of the respective material through the station and providing an output proportional to such flow; a master pulse generator for all of said stations operating to generate a fixed total number of pulses during a time interval whose length is controllable; a controller for each and every one of said stations, each of said controllers being coupled to receive pulses from said pulse generator and each being manually adjustable to pass to its output, during said time interval, only a selected fraction of said total number of pulses; means at each station save a first responsive to the outputs of the respective sensing means and of the respective controller for controlling the flow of material through the corresponding station; means for subtractively combining the outputs of the sensing means for said first station and of the corresponding controller to produce another output representative of differences between the subtractively-combined outputs; and means responsive to said other output for controlling the length of said time interval.

8. Apparatus in accordance with claim 7, wherein the last-mentioned means is operatively coupled to said pulse generator to control the pulse generation rate thereof.

9. Apparatus in accordance with claim 7, wherein the output of each sensing means comprises a series of pulses whose repetition rate is proportional to the rate of material flow through the corresponding station.

10. An apparatus for proportioning a plurality of materials, comprising a plurality of stations one for each different material; means at each station for sensing the flow of the respective material through the station and providing an output proportional to such flow; a mechanically-driven master pulse generator for all of said stations operating to generate a fixed total number of pulses during a time interval, the drive speed of said generator being controllable to control the length of such time interval; a controller for each and every one of said stations, each of said controllers being coupled to receive pulses from said pulse generator and each being manually adjustable to pass to its output, during said time interval, only a selected fraction of said total number of pulses; means at each station save a first responsive to the outputs of the respective sensing means and of the respective controller for controlling the flow of material through the corresponding station; means for subtractively combining the outputs of the sensing means for said first station and of the corresponding controller to produce another output representative of differences between the subtractively-combined outputs; and means responsive to said other output for controlling the drive speed of said generator.

11. Apparatus in accordance with claim 10, wherein the output of each sensing means comprises a series of pulses whose repetition rate is proportional to the rate of material flow through the corresponding station.

12. An apparatus for proportioning a plurality of materials, comprising a plurality of stations one for each different material; means at each station for sensing the flow of the respective material through the station and providing an output proportional to such flow; a master pulse generator for all of said stations operating to generate a fixed total number of pulses during a time interval whose length is controllable; a controller for each and every one of said stations, each of said controllers being coupled to receive pulses from said pulse generator and each being manually adjustable to pass to its output, during said time interval, only a selected fraction of said total number of pulses; means at each station save a first for subtractively combining the outputs of the respective sensing means and of the respective controller to produce at each station another output representative of differences between such subtractively-combined outputs; means for utilizing each of said other outputs to control the flow of material through the corresponding station; means for subtractively combining the outputs of the sensing means for said first station and of the corresponding controller to produce still another output representative of differences between the last-mentioned subtractively-combined outputs; and means responsive to said last-mentioned other output for controlling the length of said time interval.

13. Apparatus in accordance with claim 12, wherein the last-mentioned means is operatively coupled to said pulse generator to control the pulse generation rate thereof.

14. Apparatus in accordance with claim 12, wherein the output of each sensing means comprises a series of pulses whose repetition rate is proportional to the rate of material flow through the corresponding station.

15. In combination, means for sensing the rate of flow of a stream of material and for providing an output proportional to such rate of flow, a pulse generator operating to generate a plurality of pulses during a time interval whose length is controllable, a controller coupled to receive pulses from said pulse generator, said controller being manually adjustable to pass to its output, during said time interval, only a selected fraction of said plurality of pulses; means for detecting any departure from a predetermined relationship between the outputs of the sensing means and of the controller for producing an output indicative of the direction of departure from said relationship, and means for utilizing said last-mentioned output to change the length of said time interval in a direction to tend to restore the predetermined relationship.

16. Combination as set forth in claim 15, wherein the output of the sensing means comprises a series of pulses whose repetition rate is proportional to the rate of flow of said stream of material.

17. Combination in accordance with claim 15, wherein the last-mentioned means is operatively coupled to said pulse generator to control the pulse generation rate thereof.

References Cited by the Examiner

UNITED STATES PATENTS

| | | | |
|---|---|---|---|
| 2,059,151 | 10/1936 | Smith | 137—101.19 |
| 2,207,949 | 7/1940 | Smith | 137—186 X |
| 2,314,152 | 3/1943 | Mallory | 137—486 X |
| 2,926,684 | 3/1960 | Replagle | 137—101.19 |
| 3,174,504 | 3/1965 | Rosenbrock et al. | 137—487.5 X |

FOREIGN PATENTS

| | | |
|---|---|---|
| 637,629 | 3/1962 | Canada. |
| 873,146 | 7/1961 | Great Britain. |

M. CARY NELSON, *Primary Examiner.*

MARTIN P. SCHWADRON, *Examiner.*